United States Patent [19]

Myslinski, Jr. et al.

[11] Patent Number: 5,419,628
[45] Date of Patent: May 30, 1995

[54] DURABLE KNOCKDOWN CABINET

[75] Inventors: David P. Myslinski, Jr., Akron; Timothy P. Andrews, Depew, both of N.Y.

[73] Assignee: Ronald F. Nowak, Lancaster, N.Y.

[21] Appl. No.: 59,055

[22] Filed: May 7, 1993

[51] Int. Cl.⁶ .............................................. A47B 47/00
[52] U.S. Cl. ..................... 312/263; 312/111; 312/109; 312/138.1; 16/252; 220/4.33
[58] Field of Search ..................... 312/140, 111, 138.1, 312/257.1, 263, 265.5, 108, 109; 220/4.28, 4.33; 403/376, 380; 16/252; 52/262, 264, 270, 284

[56] References Cited

U.S. PATENT DOCUMENTS

| | | |
|---|---|---|
| 95,504 | 10/1869 | Murray et al. |
| 99,460 | 2/1870 | Murray et al. |
| 470,152 | 3/1892 | Buechele |
| 764,487 | 7/1904 | Morrison |
| 892,187 | 6/1908 | Schriefer |
| 1,109,695 | 9/1914 | Mosler et al. ............... 403/376 |
| 1,182,610 | 5/1916 | Wiesman |
| 2,787,037 | 4/1957 | Hobbs |
| 3,403,641 | 10/1968 | Baker |
| 3,545,712 | 12/1970 | Ellis |
| 3,675,955 | 7/1972 | Hajduk |
| 3,748,009 | 7/1973 | Stone |
| 4,148,454 | 4/1979 | Carlson et al. |
| 4,266,326 | 5/1981 | Hong |
| 4,513,474 | 4/1985 | Watabe ............... 16/252 |
| 4,641,896 | 2/1987 | Iimura et al. ............... 312/109 |
| 4,867,599 | 9/1989 | Sasajima |
| 4,910,915 | 3/1990 | Sanchez ............... 312/138.1 |

FOREIGN PATENT DOCUMENTS

| | | | |
|---|---|---|---|
| 1169103 | 12/1958 | France | ............... 220/4.33 |
| 1385649 | 12/1964 | France | ............... 312/111 |
| 2517944 | 6/1983 | France | ............... 312/263 |

Primary Examiner—Edward K. Look
Assistant Examiner—Christopher Verdier
Attorney, Agent, or Firm—Jaeckle, Fleischmann & Mugel

[57] ABSTRACT

A durable knockdown cabinet and kit for making the same includes, a bottom panel, a top panel, a left panel, a right panel and a plurality of clips. When assembled the left side panel with a lower interior portion of the left panel is aligned by and detachably connected to a left exterior region of the bottom panel with at least one of the clips and an upper interior portion of the left panel is aligned by and detachably connected to a left interior region of the top panel with at least one of the clips. The right side panel with a lower interior portion of the right panel is aligned by and detachably connected to a right exterior region of the bottom panel with at least one of the clips and an upper interior portion of the right panel is aligned by and detachably connected to a right interior region of the top panel with at least one of the clips. The clips each include a first and second clip section and a C-shaped locking plate. The first clip section includes a male portion and the second clip section includes a female portion with the first and second clip sections secured to opposing panels for connection. The male portion is inserted in the female portion to align the panels and the locking plate is slidably engaged over the first and second clip sections to secure the portions together. The locking plate bears substantially the entire structural stress placed upon the connection and prevents structural stress from effecting the male and female portions and preserves the alignment of each connection.

12 Claims, 8 Drawing Sheets

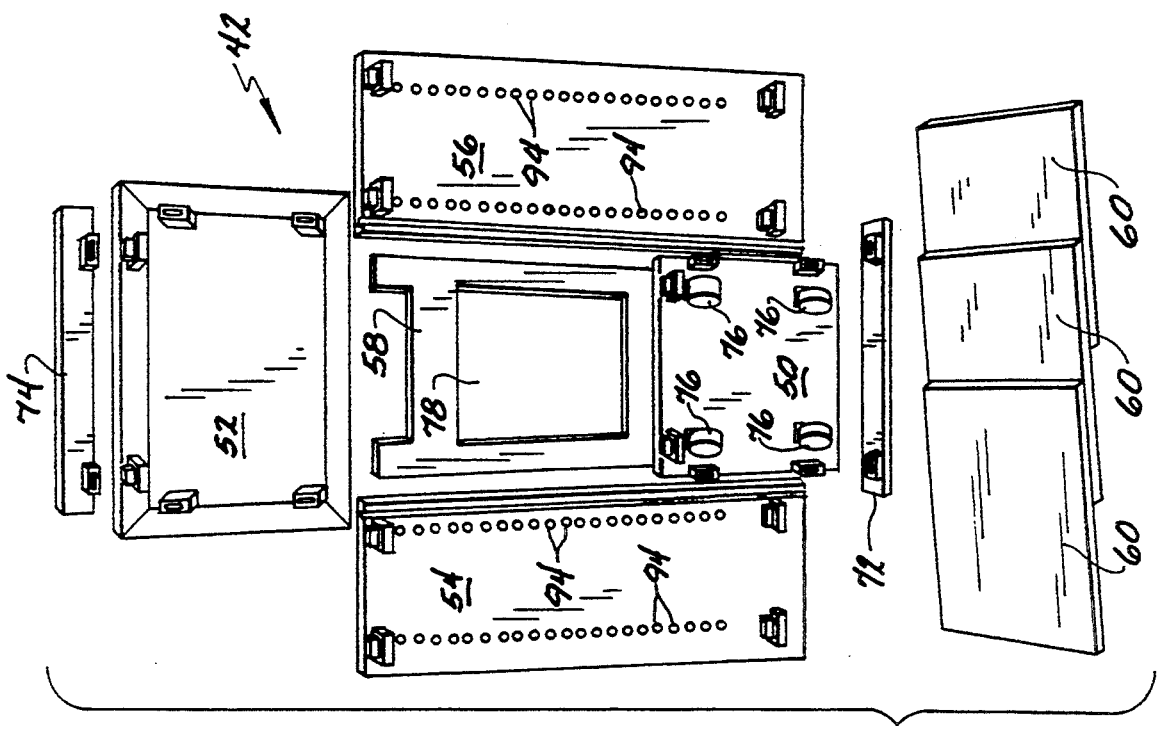
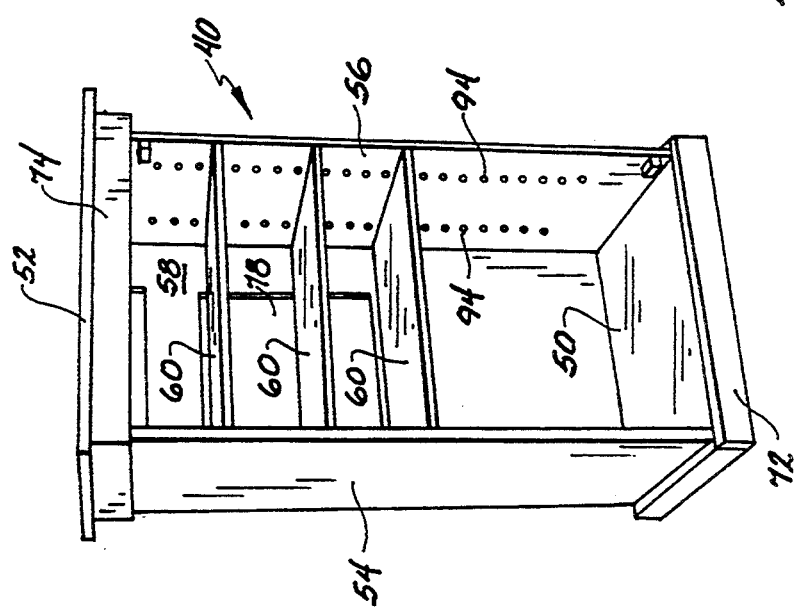
Fig. 2
Fig. 1

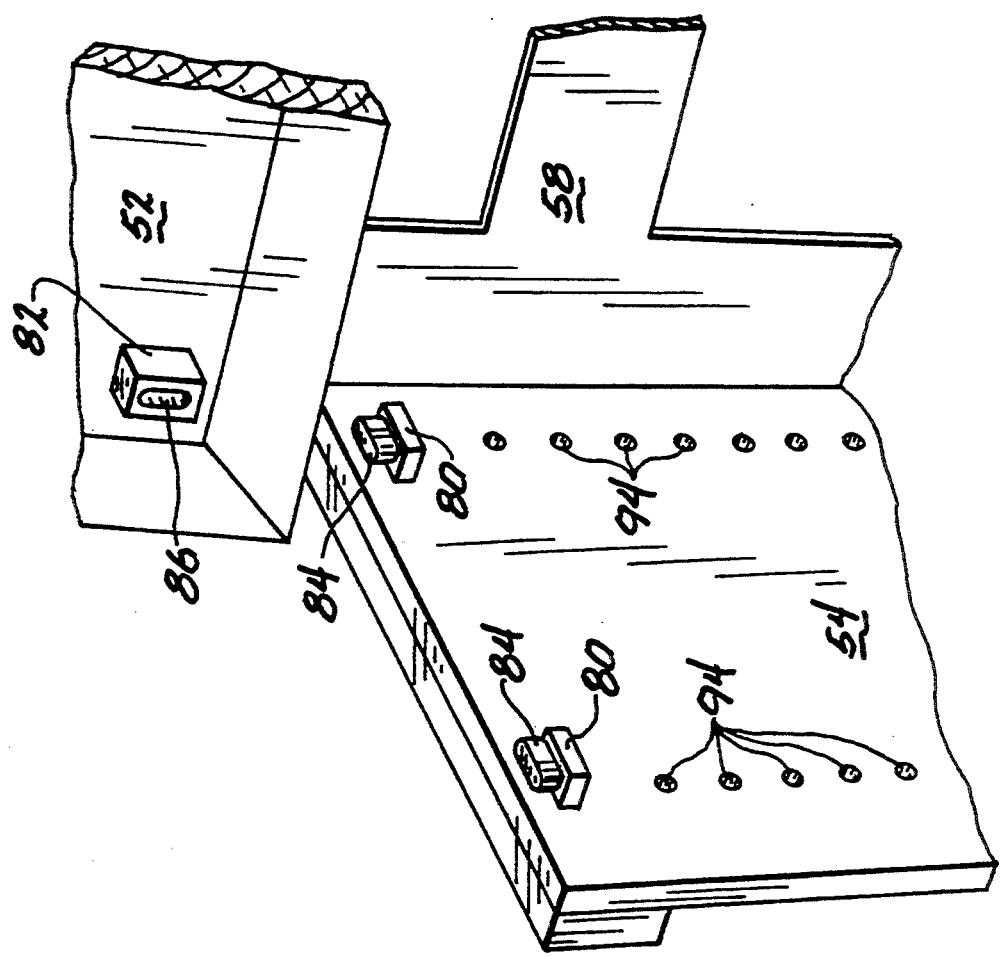

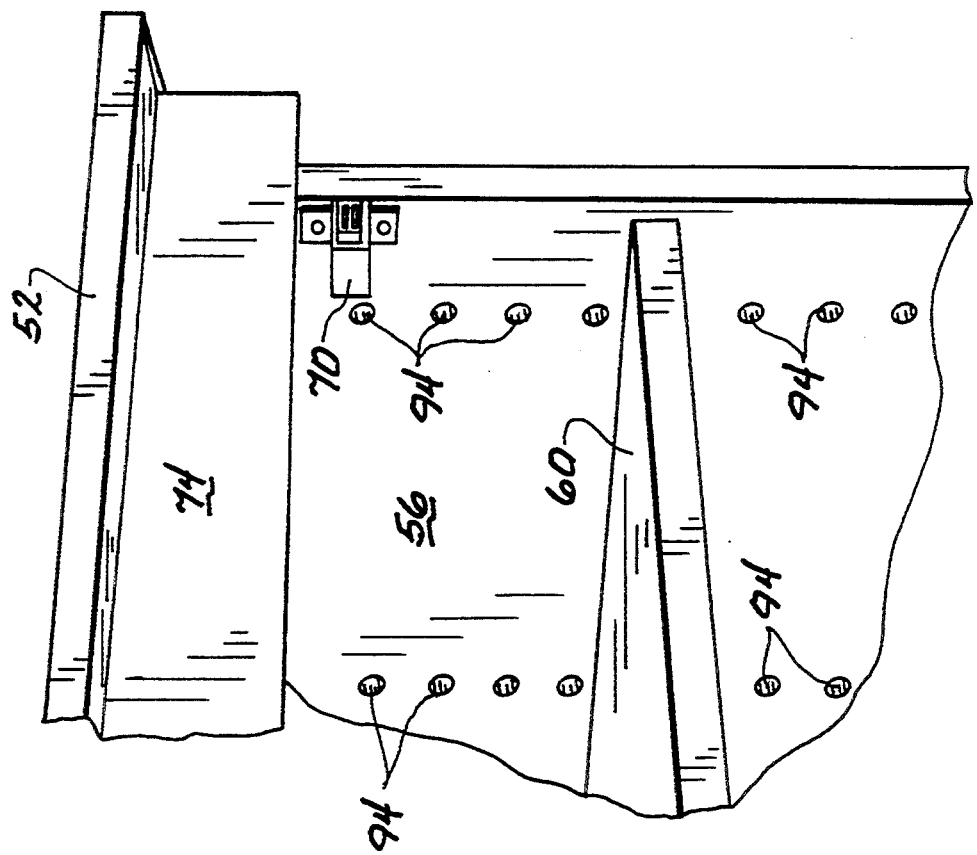

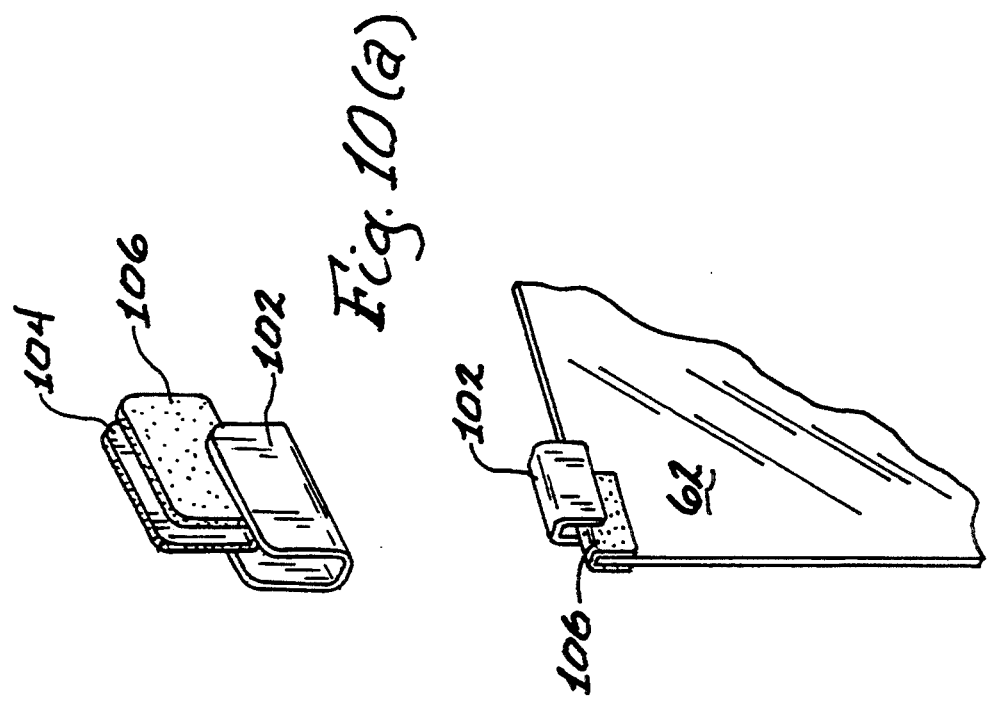
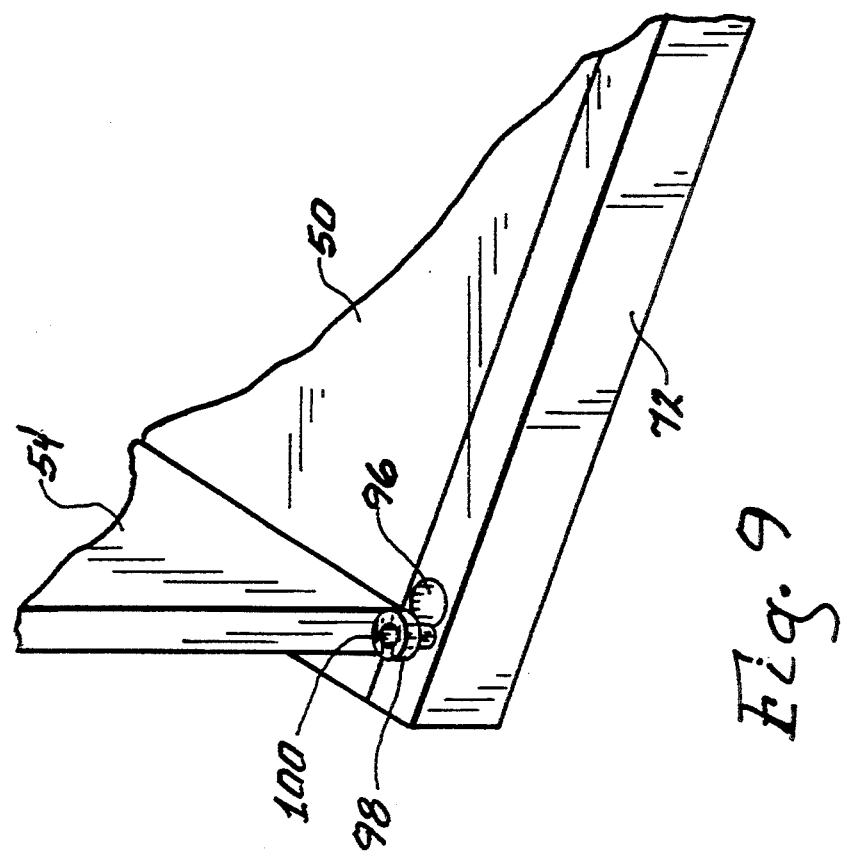

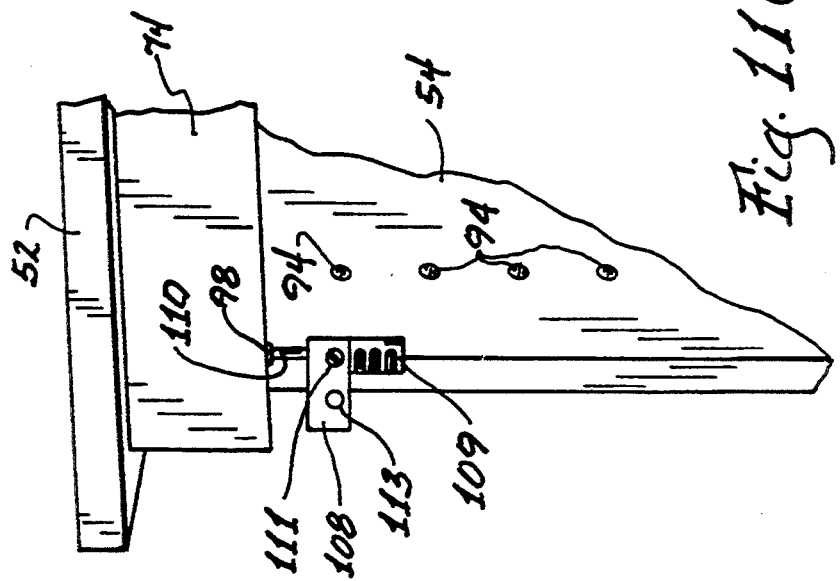
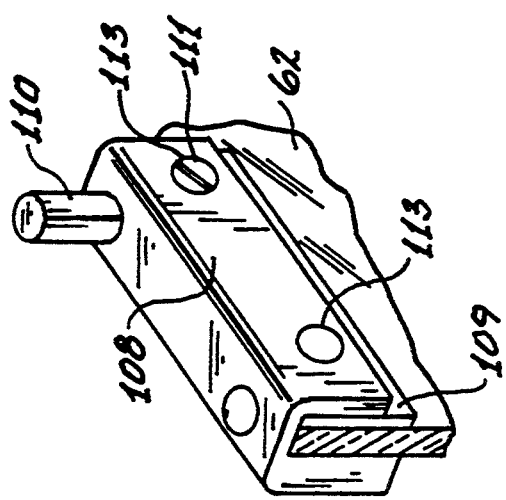
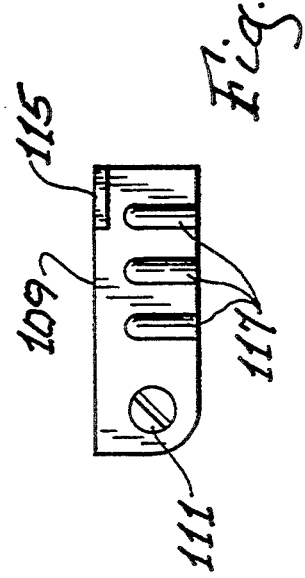

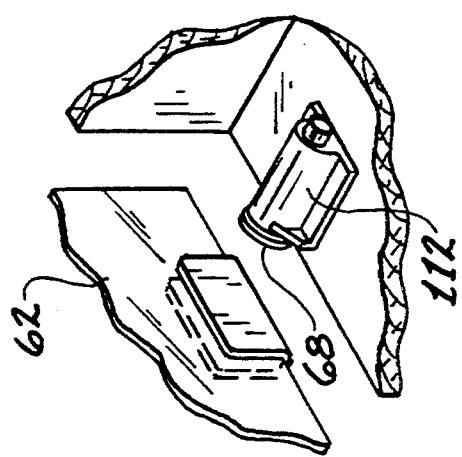
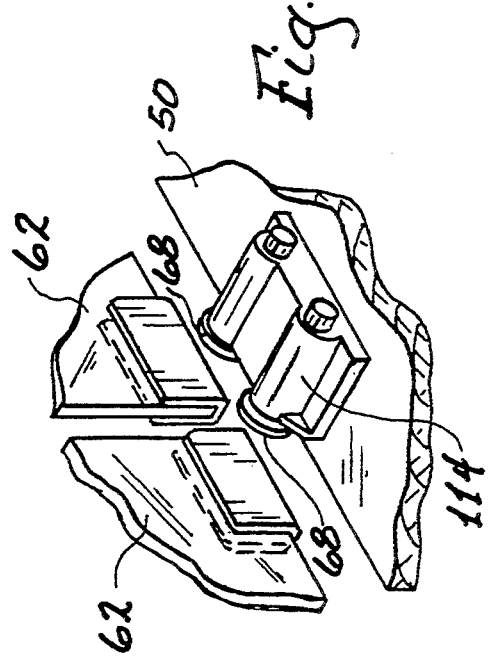
Fig. 12(a)
Fig. 12(b)

DURABLE KNOCKDOWN CABINET

FIELD OF THE INVENTION

This invention relates to knockdown furniture, and more particularly to a durable knockdown stereo cabinet with a high quality finish which is easy to assemble and to a kit for making the same.

BACKGROUND OF THE INVENTION

Despite the cost savings, many consumers avoid purchasing unassembled pieces of furniture because they expect to have problems assembling the items. Most pieces of unassembled furniture are difficult to assemble and usually require hours of labor and additional tools to construct.

Other consumers avoid purchasing unassembled furniture because of concerns about the quality and durability of the furniture. Unassembled furniture has generally been less durable and of lower quality than traditional pre-assembled furniture. Over extended periods of time, the joints in unassembled furniture often become weak causing the piece of furniture to become "wobbly". Furniture with weak joints is annoying and is dangerous when used to support expensive items such as stereo equipment.

In addition to the above-noted dissatisfaction with unassembled furniture, consumers have been unable to find unassembled furniture which meets their needs. Many consumers are becoming increasingly more mobile and want furniture which they can assemble and disassemble and move as needed. Most unassembled furniture is designed for one-time assembly and thus cannot be dismantled for subsequent moves. Other unassembled furniture which can be dismantled for a subsequent moves often have problems with durability, finish and quality as previously discussed. As explained below, prior designs have failed to address these consumer concerns.

Turning to U.S. Pat. No. 470,152 to Buechele, there is disclosed a wardrobe cabinet which is constructed in sections and adapted to be secured together or taken apart. The wardrobe is divided horizontally into several sections i.e., two-body sections, a top section and an ornamental section resting upon the top section. The body sections are adapted to be separated and telescoped one within the other for shipment.

U.S. Pat. No. 3,748,009 to Stone, discloses a cabinet and kit for making the cabinet which can be assembled without tools. The cabinet is supplied in kit form which includes basically only flat walls designed to be assembled into a kitchen cabinet without tools.

U.S. Pat. No. 892,187 to Schriefer, discloses an extensible case comprising a case-section or sections, a top unit and a bottom unit for forming a case in which a shelf or shelves may be positioned, a door or doors, and means for connecting the case, doors and shelves.

U.S. Pat. Nos. 95,504 and 99,460 to Murray et al.; 3,403,641 to Baker; 4,148,454 to Carlson et al.; 1,182,610 to Wiesman; 764,487 to Morrison; 3,675,955 to Hajduk; 3,545,712 to Ellis; and 2,787,037 to Hobbs, all disclose various types of brackets or fastening devices for furniture.

Accordingly, it is a general object of this invention to provide a durable knockdown cabinet with a high quality finish, which is easy to assemble.

SUMMARY OF THE INVENTION

According to the present invention, these and other objects and advantages are achieved in a durable knockdown cabinet and kit which can be assembled easily without tools. The cabinet and kit includes bottom, top, left and right panels and a plurality of clips.

When the cabinet is constructed, the lower interior portion of the left panel is aligned by and detachably connected to a left exterior region of the bottom panel with at least one clip and an upper interior portion of the left panel is aligned by and detachably connected to a left interior region of the top panel and with at least one clip. Similarly, a lower interior portion of the right panel is aligned by and detachably connected to the right exterior region of the bottom panel with at least one clip and an upper interior portion of the right panel is aligned by and detachably connected to the right interior region of the top panel with at least one clip. Each clip includes a first and second clip section and a C-shaped locking plate. The first clip section has a male portion and the second clip section has a female portion. The first and second clip sections are secured to opposing panels. To align the panels, the male portion is inserted into the female portion. Once aligned, the locking plate is slidably engaged over the first and second clip sections to secure the sections together. The locking plate bears substantially the entire structural stress placed upon the connection and prevents structural stress from effecting the alignment of the male and female portions.

Accordingly, a cabinet in accordance with the present invention can generally be assembled in a matter of minutes without tools. The connecting clips assure precise alignment and a secure finish. The cabinet can be disassembled with ease and without damaging any part of the structure. Repeated assembly and disassembly of the cabinet does not affect the finish, alignment or overall quality of the assembled cabinet.

BRIEF DESCRIPTION OF THE DRAWINGS

For a better understanding of the present invention, together with other and further objects, advantages and capabilities thereof, reference is made to the accompanying drawings, which are incorporated herein by reference and in which:

FIG. 1 is a perspective view of a stereo cabinet in accordance with the present invention;

FIG. 2 is a perspective view of substantially all of the parts in a stereo cabinet kit in accordance with the present invention;

FIG. 7 is a top view of the stereo cabinet and the top panel disconnected;

FIG. 8(a) is an enlarged view of the front, right corner of the stereo cabinet of FIG. 1 showing the magnetic push latch;

FIG. 8(b) is an enlarged view of the shelf pin;

FIG. 9 is a fragmentary bottom corner view of the stereo cabinet shown in FIG. 1 showing a port bracket with a port hole;

FIG. 10(a) is a perspective view of the strike plate;

FIG. 10(b) is a perspective view of the installation of the strike plate on the glass door;

FIG. 11(a) is an enlarged view of the glass door hinge;

FIG. 11(b) is a fragmentary corner view of the stereo cabinet illustrating the glass door hinge on the glass door prior to installation into the port hole;

FIG. 11(c) illustrates wedge 109 which is a part of glass door hinge 108".

FIG. 12(a) is a perspective view of another type of the magnetic push latch for the cabinet; and FIG. 12(b) is a perspective view of yet another type of magnetic push latch for a cabinet with dual glass doors.

DETAILED DESCRIPTION OF THE PREFERRED EMBODIMENT

Figure 4B:
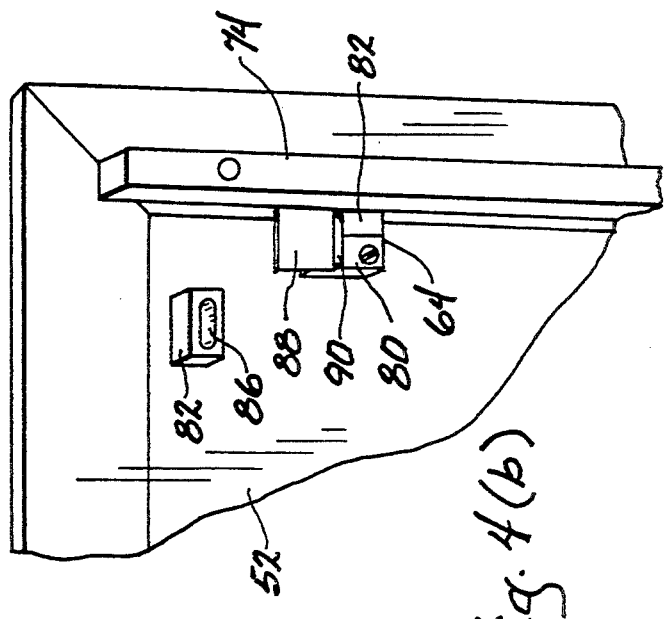
FIG. 4(b) is a bottom view of the stereo cabinet of FIG. 1 showing the connecting clips.

A durable knockdown cabinet 40 and kit 42 in accordance with the invention are illustrated in FIGS. 1 and 2 respectively. Basically, the cabinet 40 and kit 42 includes bottom 50, top 52, left 54, right 56 and back 58 panels, shelves 60, a glass door 62, a plurality of clips 64, a plurality of shelf pins 66, a strike plate 68 and magnetic push latch 70. The clips 64 are designed to first align the panels and then to secure the connection without affecting the aligning portion of the clips. The constructed cabinet 40, shown in FIG. 1, is durable and can be repeatedly assembled and disassembled with minimal, if any, effect on the durability, finish and quality. The kit 42 illustrated in FIG. 2, can be assembled without tools and with a minimal amount of time and skill.

Referring to FIG. 1, one particular embodiment for the invention is illustrated. The cabinet 40 has a bottom panel 50 which is 20 inches by 15 7/8 inches, the top panel 52 is 25¾ inches by 18 inches, the left panel 54 is 41¼ inches by 15 7/8 inches, and the right panel 56 is 41¼ inches by 15 7/8 inches. The cabinet 40 also has bottom and top trim pieces 72 and 74, respectively which in this particular embodiment are both 23 inches by 2¼ inches. The disclosure of the dimensions of the various components of the cabinet 40 is for illustration purposes only. A cabinet in accordance with the present invention can be constructed with ports having a wide variety of different dimensions.

Referring to FIG. 2, a substantial portion of the kit 42 in accordance with the invention is illustrated. As can be seen, the cabinet 40 can be disassembled into manageable parts for transportation to other locations. In this particular embodiment, casters 76 are secured to the bottom of bottom panel 50. The casters 76 are optional. Additionally, in this embodiment the back panel 58 has an opening 78 which permits access into and out of the back of the cabinet 40. A cabinet 40 in accordance with the invention could be constructed with a back panel with no openings 78 or one or more openings 78 as desired.

Referring to FIGS. 3-14, the assembly of a cabinet in accordance with the invention will be described. As will become readily apparent, the cabinet 40 can be constructed with ease and without the need for any additional tools. The time for assembly of the particular cabinet disclosed is typically less than one hour. The finished cabinet 40 provides connecting joints which are sturdy and are able to withstand structural stresses which might otherwise affect the alignment of the panels.

Figure 3A:
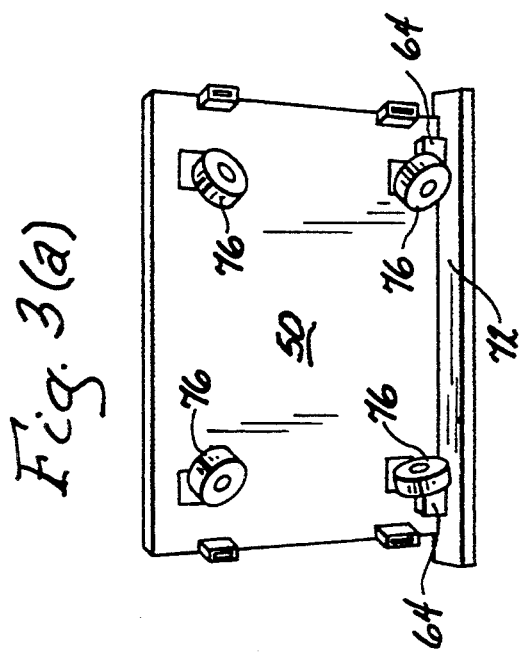
FIG. 3(a) is a bottom view of the bottom panel for the stereo cabinet shown in FIG. 1.
Figure 3B:
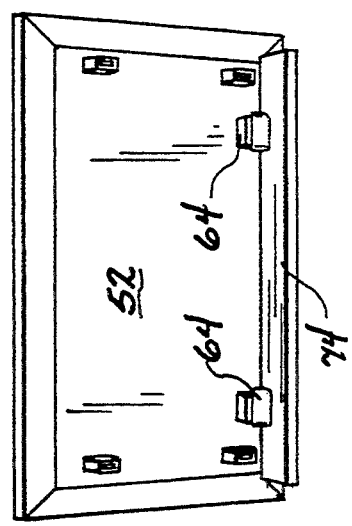
FIG. 3(b) is a bottom view of the top panel of the stereo cabinet shown in FIG. 1.

More specifically, FIGS. 3(a) and 3(b) illustrate bottom views of the bottom panel 50 and top panel 52. Typically, when constructing the cabinet 40 the bottom and top trim pieces 72 and 74 are installed on the bottom and top panels 50 and 52 first. In this particular embodiment, a pair of clips 64 secure the bottom trim piece 72 along an elongated edge of the bottom panel 50. Although two clips 64 are shown, any number of clips could be used to secure the bottom trim piece 72 to the bottom panel 50. The bottom trim piece 72 extends down from the bottom panel 50 to hide from frontal view the casters 76. Similarly, in FIG. 3(b) the pair of clips 64 secure the top trim piece along an elongated edge of the top panel 52. The top trim piece 74 extends down from the top panel 52 to complete the finish for the top panel 52. Again, the top trim piece 74 could be secured to the top panel 52 with any number of clips 64.

Figure 4A:
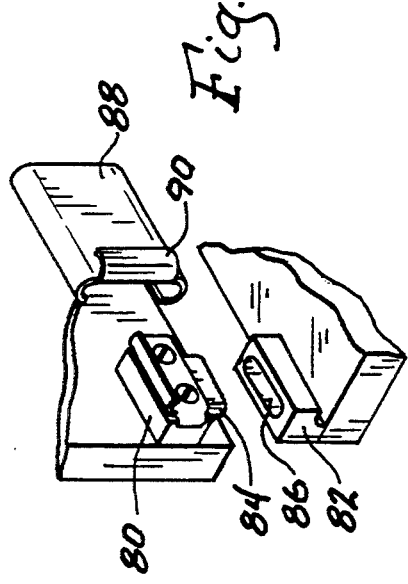
FIG. 4(a) is an enlarged, fragmentary view of a typical clip used to align and detachably connect two panels.

Referring to FIGS. 4(a) and 4(b), the formation of connections with the clips 64 is examined in greater detail. In FIG. 4(a), the clip 64 comprises a first and second sections 80 and 82, respectively and a locking plate 88. The first section 80 has a male portion 84 and the second section 82 has a female portion 86. The locking plate 88 has a substantially C-shaped configuration and includes a curved lip 90. To make a connection, the male portion 84 is first inserted into the female portion 86. This ensures a precise alignment of the panels. Once aligned, the locking plate 88 is slidably engaged using curved lip 90 over first and second sections 80 and 82. The connection is secured by the interaction of the locking plate 88 with the outer surface of the first and second sections 80 and 82. Accordingly, the male and female portions 84 and 86 are not subjected to structural stresses preserving the alignment of the connection. In FIG. 4(b), another example of a connection being formed is shown with the locking plate 88 partially engaged. More specifically, top trim piece 74 is being aligned and detachably connected to top panel 52. The male portion 84 of first section 80 has been inserted in the female portion 86 of second section 82 to align the piece 74 with the panel 52. Curved lip 90 is used to slide locking plate 88 partially over the first and second sections 80 and 82 to form the connection.

Figure 5:
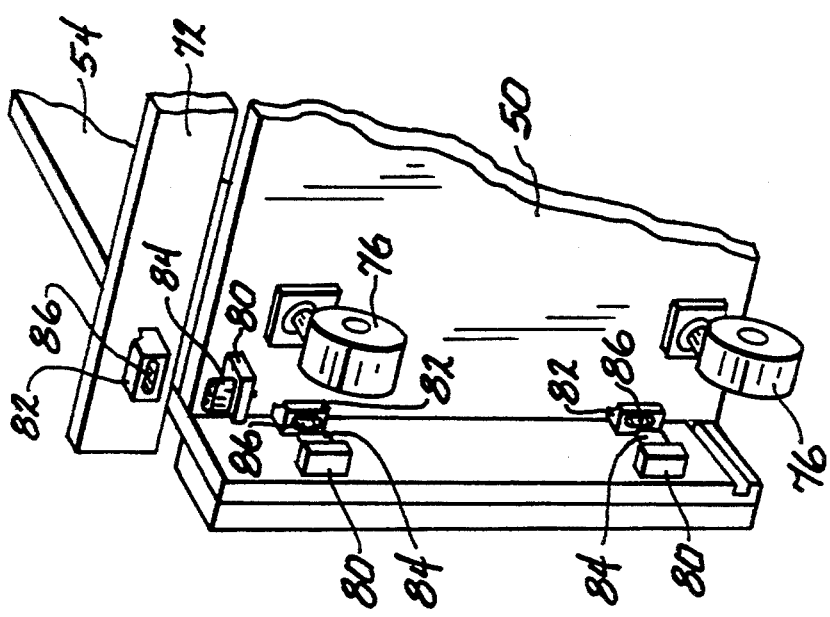
FIG. 5 is another bottom view of the top panel showing the engagement of the clip to connect two panels.

Returning to the description of the typical construction of the cabinet, in FIG. 5 the next connection is illustrated. Left panel 54 has a pair of first sections 80 which engage with a pair of second sections 82 on bottom panel 50. The first and second sections 80 and 82 are aligned and then secured with a locking plate 88 as previously described with FIGS. 4(a) and 4(b). Although not shown, right panel 56 is also typically connected to the bottom panel 50 at this time in the same manner as the left panel 54. Additionally, the left and right panels 54 and 56 can be secured to the bottom panel 50 with one or three or more clips 64 if desired.

Figure 6:
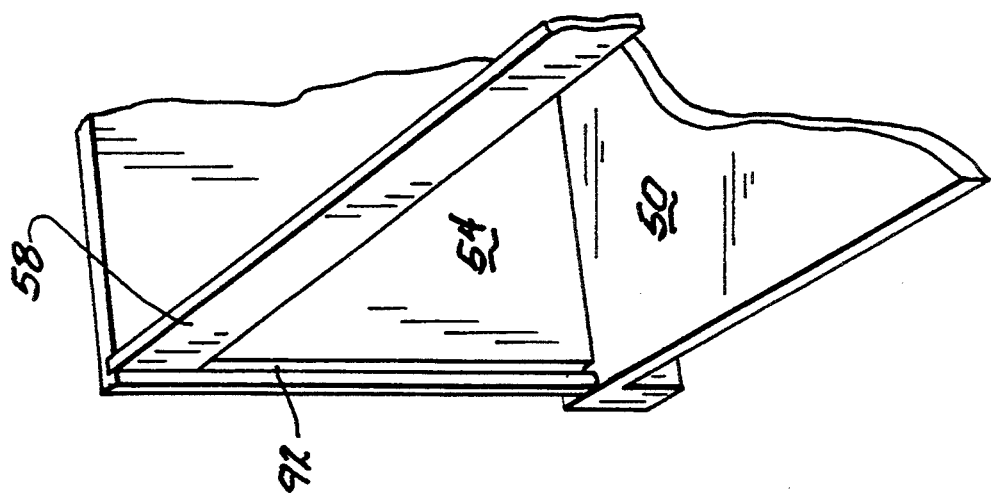
FIG. 6 is a fragmentary back view of the stereo cabinet shown in FIG. 1 illustrating the engagement of the back panel with the side panels.

Referring to FIG. 6, the back panel 58, which is optional, is typically installed next between the left and right panels 54 and 56, which are already connected to the bottom panel 50. Left and right panels 54 and 56 each have a channel 92 on their back interior surface. The channels 92 extend substantially along the length of the left and right panels 54 and 56 substantially opposing each other. Opposing side edges of back panel 58 slidably engage with the channels 92 so the back panel 58 can be slid down towards bottom panel 50, until a bottom edge of back panel 58 engages with bottom panel 50.

Referring to FIG. 7, the top panel 52 is positioned for the next connection to the left, right and back panels 54, 56 and 50, respectively. Left panel 54 has a pair of first sections 80 secured adjacent an upper edge of the left panel 54 with the male portions 84 extending upwards. Although not shown in FIG. 7, right panel 56 also has a pair of first sections 80 similarly connected. Top panel 52 has two pairs of second sections 82 secured to the interior surface of the top panel 52, only one of which is shown in FIG. 7. The second sections 82 are secured to the top panel 52 such that the female portions 86 will engage with male portions 84 when the top panel 52 is properly aligned with the left and right panels 52 and 54. Once properly aligned, the locking plates 88 (not shown) are used to secure the first and second sections 80 and 82 together. Although two first and second sections 80 and 82 are shown, one or three or more first and second sections 80 and 82 could be used.

Referring to FIG. 8(a) and 8(b), once top panel 52 is secured to left and right panels 54 and 56, shelves 60 may be added. Left and right panels 54 and 56 each have a pair of rows of holes 94 which extend longitudinally along their interior surface. Shelf pins 66 are inserted in holes 94 and a shelf 60 can be positioned to rest upon the pins 66. An enlarged view of the shelf pin 66 is illustrated in FIG. 8(b). Although in this particular embodiment three shelves 60 are shown, the cabinet may have no shelves 60 or as many shelves 60 as desired. FIG. 8(a) also shows that when top panel 52 with trim piece 74 is installed, the magnetic pushlatch 70 secured to the interior surface of the right panel 56 is below top trim piece 74. The magnetic push latch 70 is used in conjunction with the glass door 62 and strike plate 68 and will be described in greater detail later.

Referring to FIG. 9, a post bracket 98 with a post hole 100, is placed in the opening 96 in the bottom trim piece 72 adjacent the left panel 54. Similarly, although not shown, another post bracket, with a post hole 100, is placed in an opening 96 in top trim piece 74 near the left panel which is substantially opposite the other opening 96. Although not shown, if more than one door is desired, another set of openings 96 could be formed on bottom and top trim pieces 72 and 74 adjacent the right panel 56 for the other door. Additionally, if only one door 62 is used the openings 96 could also be located adjacent right panel 56, rather than left panel 54.

Referring to FIGS. 10(a) and 10(b), the strike plate 102 which includes a foil lining 104 and a piece of rubber foam 106 is shown. The foam 106 fits in the U-shaped strike plate 102. The foil lining 104 is used to protect the glue film. The strike plate 102 is slidably inserted onto a corner of glass door 62 and is designed for engagement with the magnetic push latch 70. The strike plate can be attached to the glass door 62 without tools.

Referring to FIGS. 11(a) and 11(b), glass door hinges 108 are shown, with each glass door hinge 108 including a post 110 which extends out from the hinge 108 and a wedge 109 (FIG. 11(c)). Wedge 109 is shown in an upward (operative) position in FIG. 11(a) and in a downward (inoperative) position prior to engagement with glass 62 in FIG. 11(b). As shown in FIG. 11(c), wedge 109 includes a post or hinge portion 111 which is inserted or snapped through hole 113 of glass door hinge 108. Post or hinge 111 secures wedge 109 to glass door hinge 108 and also functions as a pivot to facilitate upward and downward movement of wedge 109. Wedge 109 can also include a handle portion 115 for ease of movement and ribs or the like 117 for facilitating gripping of glass 62. The glass door hinges 108 are secured adjacent to the corners of the glass door 62 on the opposing edge of the glass door 62 from the edge with the strike plate 68. Once the glass door hinges 108 are connected, the posts 110 can be inserted in their respective post holes 100 in post brackets 98. Again, the connections for the glass door 62 can be made without the use of any tools.

The cabinet 40 is now constructed and ready for use. The cabinet can be disassembled without damaging any parts and with a minimal amount of skill and effort. Subsequent assembly and disassembly of the cabinet 40 will have little or no effect on the durability, finish and overall quality of the cabinet 40. The connections with the clips 64 will remain properly aligned and secured.

Referring to FIGS. 12(a) and 12(b), alternative embodiments for the magnetic push latch are shown. In FIG. 12(a), a single tubular magnetic push latch 112 is shown. Like magnetic push latch 70, tubular magnetic push latch 112 is intended for one glass door 62. In this embodiment, the strike plate 68 has been moved away from the corner of the glass door 62 to engage with latch 112. In FIG. 12(b), a double tubular magnetic push latch 114 is illustrated. A double magnetic push latch 112 is intended for use with dual glass doors 62. The dual magnetic push latch 112 would be connected near the center of the top trim piece 74 for engagement with a pair of strike plates 68, each on a different door 62.

The present invention provides a novel, prefabricated ready-to-use knockdown cabinet utilizing special brackets and a kit for making the cabinet. The knockdown cabinet of the invention can be quickly and easily assembled by a person of very little skill in the art of assembling furniture. More, importantly, the present cabinet can be totally assembled without tools while still maintaining its structural strength and integrity. The cabinet is described herein in detail as a stereo cabinet for purposes of illustration only. It is understood that any type of cabinet, not necessarily a stereo cabinet can be constructed in accordance with the principles of the present invention using the special brackets described hereinafter.

What is claimed is:

1. A durable knockdown stereo cabinet comprising:
    a bottom panel with a pair of bottom trim pieces and also having at least three casters mounted to the bottom of said bottom panel;
    a top panel with a pair of top trim pieces secured to opposing edges of said top panel;
    a plurality of clips;
    a left side panel with a lower interior portion of said left panel aligned by and detachably connected to a left exterior region of said bottom panel with at least one of said clips and an upper interior portion of said left panel aligned by and detachably connected to a left interior region of said top panel with at least one of said clips; and
    a right side panel with a lower interior ! portion of said right panel aligned by and detachably connected to a fight exterior region of said bottom panel with at least one of said clips and an upper interior portion of said right panel aligned by and detachably connected to a right interior region of said top panel with at least one of said clips;

said clips each having exterior surfaces and including a first and second clip section and a C-shaped locking plate, said first clip section operatively arranged to be secured to a first panel, said first clip section having a male portion extending therefrom, said second clip section operatively arranged to be secured to a second adjacent panel to be joined to said first panel, said second clip section having a female portion comprising a bore to matingly receive said male portion of said first clip section, said locking plate operatively arranged to slide over the exterior surfaces of said first and second clips to hold said clips together, wherein said locking plate is precluded from contact with said male portion or said bore of said female portion in order that structural stress will be transmitted through said locking plate and not through said male and female portions, wherein said first and second portions function to align and secure said first and second panels.

2. The stereo cabinet of claim 1, further comprising a back panel with at least one opening, said left and right side panels each having an opposing longitudinal channel on their interior back surface, the opposing edges of said back panel capable of slidably engaging with said channels to secure said back panel between said left and right side panels.

3. The stereo cabinet of claim 1, further comprising at least one shelf and a plurality of pins, said left and right panels each having a pair of opposing rows of apertures for said pins and each of said shelves supported by four shelf pins.

4. The stereo cabinet of claim 1, wherein said bottom and top trim pieces are aligned by and detachably connected to said bottom and top panels with at least one of said clips.

5. The stereo cabinet of claim 1, further comprising a glass door with a strike plate connected to one corner of said glass door.

6. The stereo cabinet of claim 5, further comprising a pair of glass door hinges connected to opposing corners on an opposite side of said door from said strike plate, said bottom and top trim pieces each having a bracket for receiving a portion of said glass door hinge to pivotally connect said glass door.

7. The stereo cabinet of claim 6, further comprising a magnetic push latch, said strike plate capable of magnetically engaging with said magnetic push latch.

8. A kit for a knockdown cabinet comprising:
a bottom panel;
a top panel;
a plurality of clips;
a left side panel with a lower interior portion of said left panel aligned by and detachably connected to a left exterior region of said bottom panel with at least one of said clips and an upper interior portion of said left panel aligned by and detachably connected to a left interior region of said top panel with at least one of said clips; and a right side panel with a lower interior portion of said right panel aligned by and detachably connected to a right exterior region of said bottom panel with at least one of said clips and an upper interior portion of said right panel aligned by and detachably connected to a right interior region of said top panel with at least one of said clips;

said clips each having exterior surfaces and including a first and second clip section and a C-shaped locking plate, said first clip section operatively arranged to be secured to a first panel, said first clip section having a male portion extending therefrom, said second clip section operatively arranged to be secured to a second adjacent panel to be joined to said first panel, said second clip section having a female portion comprising a bore to matingly receive said male portion of said first clip section, said locking plate operatively arranged to slide over the exterior surfaces of said first and second clips to hold said clips together, wherein said locking plate is precluded from contact with said male portion or said bore of said female portion in order that structural stress will be transmitted through said locking plate and not through said male and female portions, wherein said first and second portions function to align and secure said first and second panels.

9. The kit according to claim 8 further comprising a back panel, said left and right side panels each having an opposing longitudinal channel on their interior back surface, the opposing edges of said back panel capable of slidably engaging with said channels to secure said back panel between said left and right side panels.

10. The kit according to claim 9 further comprising at least one shelf and a plurality of pins, said left and right panels each having a pair of opposing rows of apertures for said pins.

11. The kit according to claim 10 further comprising a bottom trim piece and a top trim piece aligned by and detachably connected to said bottom and top panels respectively, with at least one of said clips.

12. The kit according to claim 11 further comprising at least one glass door, at least one strike plate for each glass door, at least one magnetic push latch, and a pair of glass door hinges for each glass door, said bottom and top trim pieces each having a bracket part for receiving a portion of said glass door hinge to pivotally connect said glass door and said strike plate capable of magnetically engaging with said push latch.

* * * * *